(12) United States Patent
Liestman et al.

(10) Patent No.: US 9,358,824 B2
(45) Date of Patent: Jun. 7, 2016

(54) MATTE FILM HAVING A PRINTABLE POLYALKYLIMINE CONDENSATION PRODUCT

(75) Inventors: David A. Liestman, Walworth, NY (US); Dennis E. McGee, Penfield, NY (US)

(73) Assignee: Jindal Films Americas LLC, Macedon, NY (US)

( * ) Notice: Subject to any disclaimer, the term of this patent is extended or adjusted under 35 U.S.C. 154(b) by 122 days.

(21) Appl. No.: 14/348,813

(22) PCT Filed: May 1, 2012

(86) PCT No.: PCT/US2012/035977
§ 371 (c)(1),
(2), (4) Date: Jul. 7, 2014

(87) PCT Pub. No.: WO2013/048576
PCT Pub. Date: Apr. 4, 2013

(65) Prior Publication Data
US 2014/0363593 A1     Dec. 11, 2014

Related U.S. Application Data

(60) Provisional application No. 61/540,802, filed on Sep. 29, 2011.

(30) Foreign Application Priority Data

Feb. 29, 2012    (WO) ................ PCT/US2012/027092

(51) Int. Cl.
| | |
|---|---|
| *B41M 5/41* | (2006.01) |
| *C09D 179/02* | (2006.01) |
| *B41M 5/42* | (2006.01) |
| *B32B 27/08* | (2006.01) |
| *B32B 7/12* | (2006.01) |
| *B32B 27/32* | (2006.01) |
| *C09J 7/02* | (2006.01) |
| *C09F 3/02* | (2006.01) |
| *G09F 3/10* | (2006.01) |
| *B41M 5/40* | (2006.01) |
| *B41M 5/52* | (2006.01) |
| *C08J 7/04* | (2006.01) |
| *B41M 5/50* | (2006.01) |

(52) U.S. Cl.
CPC .. *B41M 5/42* (2013.01); *B32B 7/12* (2013.01); *B32B 27/08* (2013.01); *B32B 27/32* (2013.01); *B41M 5/40* (2013.01); *B41M 5/405* (2013.01); *B41M 5/41* (2013.01); *B41M 5/504* (2013.01); *B41M 5/52* (2013.01); *B41M 5/5263* (2013.01); *C08J 7/042* (2013.01); *C09D 179/02* (2013.01); *C09F 3/02* (2013.01); *C09J 7/0257* (2013.01); *C09J 7/0275* (2013.01); *C09J 7/0296* (2013.01); *G09F 3/10* (2013.01); *B32B 2250/05* (2013.01); *B32B 2250/24* (2013.01); *B32B 2250/40* (2013.01); *B32B 2255/10* (2013.01); *B32B 2255/26* (2013.01); *B32B 2307/75* (2013.01); *B32B 2405/00* (2013.01); *B32B 2519/00* (2013.01); *B41M 5/426* (2013.01); *B41M 2205/30* (2013.01); *B41M 2205/32* (2013.01); *B41M 2205/34* (2013.01); *B41M 2205/38* (2013.01); *C08J 2479/02* (2013.01); *C09J 2203/334* (2013.01); *C09J 2423/048* (2013.01); *C09J 2423/106* (2013.01); *C09J 2423/168* (2013.01); *C09J 2479/023* (2013.01); *C09J 2479/086* (2013.01); *Y10T 428/24802* (2015.01); *Y10T 428/31721* (2015.04)

(58) Field of Classification Search
CPC .. B41M 5/41; C09D 179/02; C09J 2479/026; C09J 2423/046; C09J 2423/166; C09J 2423/106; Y10T 428/31721
USPC ........................................... 428/32.63, 473.5
See application file for complete search history.

(56) References Cited

U.S. PATENT DOCUMENTS

| 5,492,757 A | 2/1996 | Schuhmann et al. |
|---|---|---|
| 2003/0207121 A1 | 11/2003 | McGee |

FOREIGN PATENT DOCUMENTS

| WO | WO2010/008696 A1 | 1/2010 |
|---|---|---|
| WO | WO2010/093358 A1 | 8/2010 |

*Primary Examiner* — Bruce H Hess

(57) ABSTRACT

Disclosed herein is a multi-layered matte film comprising at last one layer of a coating comprising the condensation reaction product of the combination of a polyalkylimine and an acetoacetonate ("AcAc")-functional material or an oxirane-functional material, each comprising an ethenic unsaturation group, the coating adhered to a sealant film layer; a sealant layer comprising a polyolefin and having a $T_m$ within the range of from 120° C. to 170° C.; and a Flexural Modulus within the range from 500 to 1200 MPa; a core polypropylene layer; and a matte layer between the sealant layer and core layer, the matte layer comprising a blend of at least two incompatible polymers such that the Haze is at least 50%.

24 Claims, No Drawings

MATTE FILM HAVING A PRINTABLE POLYALKYLIMINE CONDENSATION PRODUCT

CROSS-REFERENCE TO RELATED APPLICATIONS

The present application claims priority to PCT Application No. PCT/US2012/035977, filed May 1, 2012, which claims priority to U.S. Provisional Patent Application Ser. No. 61/540,802 filed on Sep. 29, 2011.

FIELD OF THE INVENTION

The present invention relates to matte films with a coating(s) to promote printing ink adhesion, and more particularly to matte films with coatings of condensation polymers of polyalkylimines suitable for thermal transfer ribbon printing.

BACKGROUND

Label films with a matte, paper-like appearance are abundant in industry. Such labels can be printed with inks that are solvent-based, water-based, oxidizable, or cured with light or ionizing radiation. Matte films are disclosed in U.S. Ser. No. 13/403,180 filed Feb. 23, 2012; US 2011/0083796; U.S. Pat. No. 6,703,141; US 2002/0182391; and WO 2012/039856. One especially demanding printing technology is used in the barcode label industry, which involves the use of heat to transfer an image from a ribbon to the substrate. Often a substrate for a thermal transfer ribbon ("TTR") is produced with smooth polymeric substrate and subsequently coated with a relatively thick layer of aqueous coating containing inorganic fillers such as clay, calcium carbonate, and silica to give a matte appearance. These mineral-based filled coatings can be difficult and expensive to process in manufacturing due to their abrasiveness to the processing equipment.

Publications related to coatings include U.S. Pat. No. 6,297,328; U.S. Pat. No. 5,296,530; U.S. Pat. No. 5,525,662; U.S. Pat. No. 5,498,659; U.S. Pat. No. 5,811,121; U.S. Pat. No. 5,380,587; U.S. Pat. No. 5,382,473; U.S. Pat. No. 5,419,960; U.S. Pat. No. 5,789,123; U.S. Pat. No. 5,827,627; US 2011/0254909; and US 2007/0248810A1; and the data sheet for Epomin™ from Nippon Shokubai, 2011.

SUMMARY

The invention disclosed herein is directed to a multi-layered matte film having a first and second side, comprising a coating on at least the first side, wherein the coating is the condensation product of a polyalkylimine and one or more amine-reactive molecules comprising at least one of:

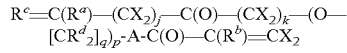

or

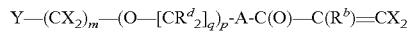

where Y is halogen or a three-membered oxirane ring; $R^a$ and $R^b$ are the same or different and are H or a $C_1$ to $C_6$ alkyl; $R^c$ is oxygen or $CX_2$; each X can be the same or different and is H, hydroxyl, halogen, or any organic radical containing at least one carbon atom, wherein each $R^d$ can be the same or different and are H or a $C_1$ to $C_6$ alkyl; A is oxygen or $NR^d$; $CR^d$ and $CR^d_2$ can each be a separate moiety or a portion of a cyclic structure; j, k, and m are integers ranging from 0 to 6, inclusive; q is an integer ranging from 1 to 6, inclusive; and p is an integer ranging from 0 to 30, inclusive; wherein the multi-layer matte film comprises at least a core layer of polypropylene, a sealant layer comprising the first side and a matte layer between the sealant layer and core layer.

The invention is also directed to a multi-layered matte film comprising: at last one layer of a coating comprising the condensation reaction product of the combination of a polyalkylimine and an acetoacetonate ("AcAc")-functional material or an oxirane-functional material, the acetoacetonate and oxirane-functional materials comprising an ethenic ($—CH=CH_2$ wherein any hydrogen can be a group Z defined herein) unsaturation group, the coating adhered to a sealant layer; a sealant layer comprising a polyolefin, having a $T_m$ within the range of from 120° C. to 170° C.; and a melt flow rate (ASTM 1238, 2.16 kg/230° C.) with the range of from 3 g/10 min to 20 g/10 min; and an elongation (ASTM D638) within the range of from 500% to 1200%; and a density of from 0.85 g/cm$^3$ to 0.94 g/cm$^3$ (ASTM D792); and a tensile strength at break (ASTM D638) within the range from 30 MPa to 60 MPa; and a Flexural Modulus (ASTM D790) within the range from 500 MPa to 1200 MPa; a core polypropylene layer; and a matte layer between the sealant layer and core layer, the matte layer comprising a blend of at least two incompatible polymers such that the Haze (ASTM D1003) is at least 50% or 60% or 70% or 80%.

The various descriptive elements and numerical ranges disclosed herein can be combined with other descriptive elements and numerical ranges to describe the invention(s); further, any upper numerical limit of an element can be combined with any lower numerical limit of the same element to describe the invention(s).

Throughout the specification, when stating "consisting essentially of" what is meant is that any other components and/or additives, if present, are present to no more than 1 wt % or 2 wt % or 3 wt % or 5 wt % of the claimed composition.

DETAILED DESCRIPTION

The inventors have produced a polymeric film with a surface that inherently (without a coating) has a matte appearance. A "coating" in this regard means a layer of material applied to the surface of some substrate, such as a film, that was originally a liquid or suspension in a diluent, the diluent removed (e.g., evaporated) so that only a solid layer of material is left on the substrate. This film may be opaque (cavitated or mineral-filled) with one or more matte-appearing surfaces or a translucent non-cavitated film with one or more matte-appearing surfaces. This allows for the option to produce products with coatings that are potentially free of mineral fillers (or "fine inorganic solids") having very low coating weights, although mineral-containing coatings are not necessarily excluded. The matte appearance is caused when two or more extrudable polymers are blended that are somewhat or substantially immiscible. In this invention the matte layer is covered with a sealant layer—typically an ethylene-propylene ("EP") copolymer, ethylene-propylene-butene ("EPB") terpolymer, medium density polyethylene ("MDPE"), and/or high density polyethylene ("HDPE"). By covering the matte layer with a sealant layer, manufacturing problems related to polymer drips and carbon build-up on the die lip (commonly encountered during the extrusion of immiscible blends) are reduced or eliminated, because the high-drag and die-swell characteristics of the immiscible layer do not come in contact with the die lip.

Preferred embodiments of the matte films have one or both sides of a multi-layered matte film coated with relatively thin layers of coatings prepared from condensation reactions between polyalkylimines or polyalkylamines ("PAIs") such as poly(ethyleneimine), and acetoacetoxyethyl methacrylate ("AAEM") or other amine-reactive materials that contain ethenic unsaturation. Not only do these coatings enhance substrate printability with a wide variety of ink technologies (including a wide variety of TTR ribbons), these relatively thin coatings can also improve static dissipation and lower coefficient of friction to improve the dispensing and machining of labels and label face stocks while offering economic advantages over substrates coated with thicker, mineral-filled materials.

Polyalkylimine ("PAI") Condensation Product

The coatings disclosed herein are disclosed in U.S. Ser. No. 13/408,299 filed on Feb. 29, 2012, which is directed to compositions comprising the condensation product of polyalkylimines with certain amine-reactive molecules, thus forming condensation polymers, the inventive coating hereinafter referred to as "PAI condensation product" or simply "coating". The coatings are UV curable but do not require curing or cross-linkers for their intended use. The condensation products tend to form soluble or substantially soluble compositions in aqueous media at and above pH 8.0 or 8.5. By "aqueous", what is meant is a diluent comprising at least 50 wt % or 60 wt % or 70 wt % or 80 wt % water, and preferably comprising at least 95 wt % or 100 wt % water. The compositions are particularly useful as coatings on films. Such coatings are present in a sufficient amount to enhance the printability of ink on the film surface, and preferably, to maintain the ink on the surface for extended periods with typical wear and moisture conditions. The condensation product can serve as a primer, (a coating layer that is in between the primary printable coating and the film to enhance the adhesion of the printable coating to the film structure) for itself or other coatings. In either case, one advantage of the condensation polymers is that they require very low loadings compared to current coatings.

Desirably, the PAI condensation product need not be processed (e.g., concentrated, diluted, heated, chilled, etc.) or purified any further prior to its use as a coating for films; it may be used as it is to coat the film, or with additional ingredients such as surfactants, fine inorganic solids, blocking agents, etc., described further herein.

Preferably, the coating weight of the PAI condensation product on the film surface (either as a primer or as the primary printable coat) is less than 0.30 or 0.20 or 0.15 or 0.10 g/m² or within the range from 0.001 or 0.01 to 0.10 or 0.15 or 0.20 or 0.30 g/m².

Another advantage to the coating compositions described herein is that they are free of volatile organic compounds ("VOC"). Thus, in certain embodiments are described compositions and coatings that are free of VOCs. VOCs are organic chemicals that have a high vapor pressure at ordinary, room-temperature conditions, non-limiting examples of which include formaldehyde, ethyl alcohol, hexane, terpenes, toluene, and acetone.

In one aspect is a composition comprising the condensation product of a polyalkylimine and one or more amine-reactive molecules comprising (or selected from the group consisting of) at least those in formulas (1) or (2):

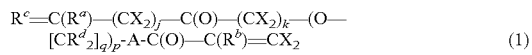

(1)

or

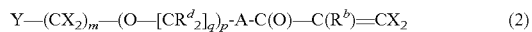

(2)

where Y is halogen or a three-membered oxirane ring; $R^a$ and $R^b$ are the same or different and selected from the group consisting of H and $C_1$ to $C_6$ alkyl; $R^c$ is selected from the group consisting of oxygen (O, divalent) and —$CX_2$; each X can be the same or different and is selected from the group consisting of H, hydroxyl, halogen, and any organic radical containing at least one carbon atom, preferably $C_1$ to $C_4$ alkyls, wherein each $R^d$ can be the same or different and are H or a $C_1$ to $C_6$ alkyl; A is selected from the group consisting of oxygen and —$NR^d$; —$CR^d$ and —$CR^d_2$ can each be a separate moiety or a portion of a cyclic structure; j, k, and m are integers ranging from 0 or 1 to 4 or 6, inclusive; q is an integer ranging from 1 to 4 or 6, inclusive; and p is an integer ranging from 0 or 1 to 6 or 10 or 15 or 20 or 30, inclusive.

Preferably, $R^c$ is oxygen; $R^a$ and $R^b$ is methyl or H; X and $R^d$ is hydrogen (H); j is 1; k is 0; q is 2; p is 1; and A is oxygen. In another embodiment, Y is a three-membered oxirane ring ($CH_2(O)CH_2$); m is 1; p is 0; A is oxygen; $R^b$ is methyl (—$CH_3$); and X is hydrogen (H). In desirable embodiments, the amine-reactive molecule is selected from the group consisting of 2-hydroxy-3-chloropropylacrylate, glycidyl methacrylate ("GMA"), glycidyl acrylate, acetoacetoxyethyl methacrylate ("AAEM"), acetoacetoxyethyl acrylate, acetoacetoxy(methyl)ethyl acrylate, acetoacetoxypropyl acrylate, acetoacetamidoethyl acrylate, acetoacetamidoethyl methacrylate, and acetoacetoxybutyl acrylate, and combinations thereof. Methyl, hydroxyl, and/or halogen derivatives of each may also be useful.

More generally, the PAI condensation polymer can be described as the condensation reaction product of the combination of a polyalkylimine and an acetoacetonate ("AcAc")-functional material or an oxirane-functional material. This combination is preferably carried out in aqueous medium, and the reaction product can preferably be used without further purification. In either case, reaction product is a material with ethenic (e.g., $CZ=CZ_2$, wherein each Z is preferably hydrogen, but any one or more of which may also be a $C_1$ to $C_6$ alkyl group, a halogen, or hydroxide group, or a combination thereof) unsaturation as part of the "functional" group.

The polyalkylimine ("PAI") can be any oligomer or polymer, or mixture thereof, having at least one "imine" group (—N(R)—) or at least one "amine" group (—N(R)₂—) incorporated therein, most preferably imine groups, wherein "R" here is a hydrogen or $C_1$ to $C_6$ alkyl, preferably a hydrogen or methyl, most preferably hydrogen. Desirably, the imine or amine group(s) is directly pendant from the backbone or part of the polymer backbone, most preferably part of the backbone of the polymer. In one embodiment, the polyalkylimine is an imine containing polymer comprising $C_2$ to $C_{10}$ alkyl or alkenyl-derived units in the backbone. Preferably, the PAI comprises imine-derived units and alkyl-derived units, and most preferably, the PAI consists of imine groups and alkyl-derived units. Most preferably, the PAI is selected from the group consisting of polyethyleneimine, polypropyleneimine, polypropyl-co-ethyleneimine, and mixtures thereof. In particular embodiments, styrenic-derived units, such as present in styrenated acrylic resin, are absent from the polyalkylimine. In any case, the PAI preferably has a weight average molecular weight ($M_w$) of from 3,000 or 5,000 or 10,000 or 20,000 or 40,000 to 80,000 or 100,000 or 150,000 or 200,000 or 300,000 or 500,000 or 1,000,000 or 2,000,000 g/mol; the most preferred $M_w$ is within the range of from 40,000 or 50,000 g/mol to 80,000 or 100,000 or 120,000 g/mol.

The condensation polymers described herein are typically produced in an aqueous solution by combining the amine-reactive molecules with a PAI. Amine-reactive molecules are molecules that include at least one moiety that will react with an amine/imine to form a covalent or ionic chemical bond, preferably covalent. Desirably, there are from 0.1 or 0.2 to 0.6 or 0.8 or 1.0 or 1.1 or 1.2 or 2.0 or 2.5 or 3.0 amine-reactive equivalents ("ARE") of the amine-reactive molecules that are combined per amine/imine equivalent with the PAI. Desirably, the product can be isolated from an aqueous diluent in solution or substantially in solution at a pH of at least 8.0 or 8.5. The product of the condensation reaction between the PAI and amine-reactive molecule is the condensation polymer as described herein, but in certain embodiments it is not necessary to specifically isolate the condensation polymer from the reaction medium, hence, in certain embodiments, the usefulness of the condensation polymer is as the entire mixture or condensation product. The condensation polymer can be used for coating in solutions or suspensions at most any pH, and in certain embodiments, the composition, when used as a coating, is a suspension having a solids content within the range of from 0.1% or 0.5% or 1% to 3% or 4% or 5% or 8% or 10% or 30% or 50% or 60%, by weight of the coating.

The PAI condensation products of the invention may also be further modified or cross-linked by either chemical means or radiative means. Secondary alkylamines are known to undergo Michael-type additions reactions at room temperature with ethenically unsaturated compounds like methyl acrylate, acrylonitrile, and many other materials with similar functionality (Mather et al., 31 *Progress in Polymer Science*, 487-531 (2006)). Typical Michael-acceptors that are α,β-unsaturated carbonyl compounds are thus preferred in cross-linked PAIs to further modify or cross-link PAIs. Examples of non-cross-linking Michael-type PAI modifiers include acrylates (for example, methyl acrylate, 2-hydroxyethyl acrylate, acrylamide) or acrylonitrile. To significantly increase the molecular weight of the PAI, the polymer can be cross-linked with poly-functional acrylates such as 1,6-hexanediol diacrylate, trimethylolpropane triacrylate, pentaerythritol triacrylate ("PETA"), or other readily available materials, some of which contain varying degrees of ethoxylation or propoxylation. But in a preferred embodiment, the PAI condensation products are not cross-linked and the composition and coating containing the condensation polymer does not contain cross-linking agents. In any case, the most preferred $M_w$ of the PAI condensation polymer is within the range of from 40,000 or 50,000 g/mol to 80,000 or 100,000 or 120,000 g/mol.

The PAI condensation product is preferably applied to the multi-layered matte film on the sealant side (or sealant layer) of the matte film as an aqueous emulsion. The aqueous emulsion includes the PAI condensation polymer from 5 wt % or 8 wt % or 10 wt % to 20 wt % or 24 wt % or 28 wt % or 32 wt % of the emulsion; and from 0.5 wt % or 1 wt % or 2 wt % to 4 wt % or 5 wt % or 6 wt % of a polyolefin emulsion that in itself includes 40 wt % to 50 wt % of the polyolefin by weight of the emulsion, preferably polyethylene; and from 5 wt % or 10 wt % to 15 wt % or 20 wt % or 25 wt % of a fine inorganic solid such as calcium carbonate by weight of the emulsion. More preferably, fine inorganic solids are substantially absent, meaning that if they are present to any detectable level, they are present to less than 1 wt %, and most preferably fine solids are absent.

The final, dried coating comprises from 50 wt % or 60 wt % or 65 wt % or 70 wt % to 75 wt % or 80 wt % or 85 wt % or 90 wt % or 95 wt % of the PAI condensation polymer; from 5 wt % or 10 wt % to 20 wt % or 30 wt % or 40 wt % fine inorganic solid; and from 5 wt % or 10 wt % to 20 wt % or 25 wt % of the polyolefin from the emulsion. Preferably, inorganic solids are substantially absent, and most preferably are absent. The coating may also include a minor amount of a surfactant, especially a non-ionic surfactant, at levels of from 0.001 wt % or 0.005 wt % to 0.01 wt % or 0.05 wt % or 0.5 wt % or 1.0 wt %. Examples of desirable surfactants include ethoxylated and/or acetylenic $C_6$ to $C_{20}$ diols, such as ethoxylated tetramethyldecynediol or secondary alcohol ethoxylates like Tergitol 15-S-9 (Union Carbide). Examples of desirable fine inorganic solids include calcium carbonate, silica, alumina, silica alumina, glass, clays, and combinations thereof. Preferable particle sizes are within the range of from 1 or 20 or 30 nm to 100 or 150 or 200 or 500 or 1000 nm average particle size. Examples of polyolefin emulsions include MichemEmulsion™ 91240G.E from Michelman, Inc. (Aubange, Belgium), and other commercial additives to improve slip properties and mar resistance.

Multi-Layered Matte Films

A desirable use of the condensation product is in coatings for films, especially matte films as described herein. Thus, in one aspect of the invention, described herein is a film comprising at least one polymer layer having a first and second side, further comprising a coating on at least the first side, wherein the coating is the condensation product of a polyalkylimine and one or more amine-reactive molecules selected from molecules of formulas (1) and (2) as described above. The "film" can be made of most any material and can be multiple layers of materials as is known in the art, but most preferably the film comprises at least a core layer of polypropylene, a sealant layer comprising the first side and a matte layer between the sealant layer and core layer. Desirably, the condensation product is adhered to at least the first side of the matte film. Thus, in one embodiment, the first and second sides of the film are coated with the polyalkylimine condensation product. Preferably, the coating weight of the condensation product, once dried on the film surface (first or second), is less than 0.30 or 0.20 or 0.15 or 0.10 g/m²; or within the range from 0.001 or 0.01 to 0.10 or 0.15 or 0.20 or 0.30 g/m².

Preferably, the core layer comprises (or consists essentially of, or consists of) polypropylene, which can be any polymer having at least 50 wt %, by weight of the polymer, of propylene-derived units. In a particular embodiment, the polymer is polypropylene. The "polypropylene" is a polymer comprising from 98 wt % to 100 wt % propylene-derived units and can be made by any desirable process using any desirable catalyst as is known in the art, such as a Ziegler-Natta catalyst, a metallocene catalyst, or other single-site catalyst, using solution, slurry, high pressure, or gas phase processes. The polypropylenes have a melting point (ASTM D3418, $T_m$) of at least 130° C. or 140° C., or within a range from 130° C. to 180° C. A "highly crystalline" polypropylene is a preferred polypropylene useful in certain embodiments, and is typically isotactic and comprises 100 wt % propylene-derived units (propylene homopolymer) and has a relatively high $T_m$ of from greater than 140° C. or 145° C. or 150° C. or 155° C. or 160° C. or 165° C. as measured by ASTM D3418.

The term "crystalline," as used herein, characterizes those polymers which possess high degrees of inter- and intra-molecular order. In certain embodiments, the polypropylene has a heat of fusion ($H_f$) greater than 60 J/g or 70 J/g or 80 J/g, as determined by DSC analysis. The heat of fusion is dependent on the composition of the polypropylene; the thermal energy for the highest order of polypropylene is estimated at 189 J/g that is, 100% crystallinity is equal to a heat of fusion of 189 J/g. A polypropylene homopolymer will have a higher heat of fusion than a copolymer or blend of homopolymer and copolymer.

In any case, in certain embodiments, the polypropylene has a melt flow rate ("MFR", 230° C., 2.16 kg, ASTM D1238)

within the range of from 0.1 or 0.5 or 1 g/10 min to 4 or 6 or 8 or 10 or 12 or 16 or 20 g/10 min. Also, in any case, the polypropylene may have a molecular weight distribution (determined by GPC) of from 1.5 or 2.0 or 2.5 to 3.0 or 3.5 or 4.0 or 5.0 or 6.0 or 8.0. Suitable grades of polypropylene, and in particular, highly crystalline polypropylenes that are useful in oriented films include those made by ExxonMobil, Lyondell-Basell, Total, Borealis, Japan Polypropylene, Mitsui, and other sources.

In a particular embodiment, the matte film having the coating comprises at least three layers, wherein a core layer comprises polypropylene, and at least one sealant layer "A" is adhered to the matte layer "B", and the matter layer adhered to the core layer "C" in an A/B/C configuration. Even more particularly, there may be additional matte and sealant layers on the opposing side of the core layer. Thus, the final structure may be one of A/B/C/B/A, wherein "A" is a sealant layer, where each layer may be made of the same or different materials, "B" is a matte layer (each the same or different), and "C" is a core layer. Desirably, the polyalkylimine condensation product is coated on at least one sealant layer. In certain embodiments, the first side of the film has ink printed thereon, and the second side has adhesive adhered thereto.

Matte Layer

The matter layer is made from a blend of at least two incompatible or heterogeneous polymers such that the Haze (ASTM D1003) is at least 50% or 60% or 70% or 80%. Materials useful for matte resins include, but are not limited to, ethylene propylene copolymers and blends of incompatible polymers, such as EP random copolymers, polypropylene homopolymers, HDPE, ethylene vinyl acetate ("EVA"), ethylene methyl acrylate ("EMA"), ethylene ethyl acrylate ("EEA"), EPB terpolymers, propylene-butylene ("PB") copolymer, and combinations thereof.

Preferred matte resins are chosen in part because they contain polymers which contribute to the sealability of the film. For example, in the preferred forms, the matte resin is a blend of incompatible polymers wherein at least one of the polymers in the blend has good sealant properties. Thus, in preferred forms at least one polymer of the matte resin has a reduced $T_m$ as compared to more crystalline polymers. This allows the matte resin to contribute to the matte surface of the multi-layer film and also to the sealability of the film. In particularly preferred forms, the matte resin comprises a blend of polypropylene, HDPE, and an EPB terpolymer, wherein most preferably the EPB terpolymer is present in the blend within the range of from 30 wt % or 40 wt % to 60 wt % or 70 wt % and the HDPE is present from 5 wt % or 8 wt % to 12 wt % or 15 wt %, the polypropylene making up the remainder of the tri-polymer blend. Ampacet Corporation makes desirable masterbatches and resin blends for matte film applications.

The matte resin can also be a blend of high density polyethylene resins and a predominately propylene based polymer (homopolymer, copolymer, or terpolymer). The matte resin may include blends of polyethylene with different densities; such as, for example, a blend of HDPE with a density of greater than or equal 0.94 g/cm³ and a lower density polyethylene with a density of 0.92 g/cm³ or less.

Particular matte resins may include blends of a low molecular weight copolymer and/or terpolymer with a high molecular weight copolymer and/or terpolymer. For example, the matte resin may be formed by providing a blend of at least one higher molecular weight component and at least one lower molecular weight component. The higher molecular weight component is HDPE in some embodiments. The ratio of higher molecular weight copolymer and/ or terpolymer to lower molecular weight copolymer and/or terpolymer, may be in the range of 25:75 to 75:25 or 50:50 high molecular weight component to low molecular component.

Examples of suitable higher molecular weight copolymers and/or terpolymers include, but are not limited to, copolymers and terpolymers having a melt flow rate less than or equal to 8 dg/min, as measured by ASTM D 1238 under a load of 2.16 kg at 230° C. (230° C./2.16 kg), such as JPC XPM 7700, JPC XPM 7790, or JPC XPM 7800 series propylene terpolymers (Japan Polypropylene Corporation, now sold by The Polyolefin Company, Singapore) or Total 8573 (Total Petrochemical Company). Examples of suitable lower molecular weight copolymers and/or terpolymers include, but are not limited to copolymers and terpolymers having a melt flow rate greater than or equal to 10 dg/min.

Suitable HDPE may have a melt index less than 1.0 g/10 min or less than 0.5 g/10 min (ASTM D1238, 190° C./2.16 kg), or within a range of from 0.1 to 1.0 or 2.0 or 5.0 or 10 g/10 min. The HDPE may have a density in the range of 0.940 g/cm³ or 0.950 g/cm³ to 0.970 g/cm³, and a $T_m$ of in the range of 115° C. or 120° C. to 135° C. or 140° C.

In other embodiments, the matte resin may include a PE copolymer and an EPB terpolymer. In some embodiments, the PE copolymer and terpolymer are propylene-based polymers. The PE copolymer may be a blend of different kinds of PE copolymers.

In other embodiments, the matte resin may include two immiscible polyolefin copolymers. For example, the immiscible blend can include two or more ethylene-based polymers each having different densities. In one form, the blend comprises at least a first ethylene-based polymer having a density of at least 0.91 g/cm³ and a second ethylene-based polymer having a density different from the density of the first ethylene polymer, preferably different by at least 0.050 g/cm³ or more. For example, the blend may comprise HDPE and LDPE and/ or LLDPE. The ratio of the blend components may vary depending upon the polyethylene components of the blend and the desired characteristics of the layer. A blend, in which an equal proportion of each component is employed, such as a 50/50 blend, may be used.

Some suitable matte resins include blends of at least one EPB terpolymer and an ethylene-based polymer. The ethylene-based polymer may be a HDPE or may be a LDPE. In other forms, the matte resin is a blend of at least one EPB, at least one LDPE, and at least one HDPE, for example, such as a blend of EPB terpolymer, a HDPE (e.g., 0.94 to 0.96 g/cm³), and relatively smaller amount of a lower density polyethylene (e.g., 0.92 g/cm³ or less).

Sealant Layer

The sealant layer is generally one of the outermost layers of the matte and is used to "seal" the matte layer. While the term "sealant" is used to describe this layer, an adhesive is not required. In a preferred embodiment, the sealant layer is contiguous to the matte tie layer. In other embodiments, one or more other layers may be intermediate the matte tie layer and the sealant layer. Generally, the sealant layer is on the same side of the core layer as the matte tie layer.

Preferably, the sealant layer comprises a polymer that has a reduced $T_m$ as compared to more crystalline polymers, and has a haze (ASTM D1003) when formed as a film of less than 15% or 10% or 5% and a gloss (ASTM D2457) of greater than 70% or 80% or 90%. For example, suitable sealant layer polymers include: polypropylene homopolymers, EP copolymer, PB copolymer, EPB terpolymer, ethylene vinyl acetate, and blends thereof, whether produced by Ziegler-Natta or metallocene catalysts. Examples of suitable commercially available EPB terpolymer is JPC 7794 or JPC 7320, (Japan Polypropylene Corporation, or FL7320L, The Polyolefin Company, Singapore).

A preferable polyolefin, most preferably an EP copolymer or EPB terpolymer, for use in the sealant layer has a $T_m$ within the range of from 120° C. or 125° C. or 130° C. or 135° C. to 150° C. or 155° C. or 160° C. or 165° C. or 170° C.; and a melt flow rate (ASTM 1238, 2.16 kg/230° C.) with the range of from 3 or 4 g/10 min to 10 or 12 or 16 or 20 g/10 min; and an elongation (ASTM D638) within the range of from 500% or 600% to 900% or 1000% or 1200%; and a density of from 0.85 g/cm$^3$ to 0.92 or 0.94 g/cm$^3$ (ASTM D792); and a tensile strength at break (ASTM D638) within the range from 30 or 35 MPa to 50 or 55 or 60 MPa; and a Flexural Modulus (ASTM D790) within the range from 500 or 550 or 600 or 650 MPa to 720 or 750 or 800 or 850 or 900 or 950 or 1000 or 1200 MPa.

The sealant layer may consist essentially of (i.e., include less than 5 wt % or 3 wt % "additives") the EP copolymer or EPB terpolymer, or may consist of these polymers. Blends may also be utilized in the sealant layer. Thus, along with the EP copolymer or EPB terpolymer, there can be, for example, other polymers, such as polypropylene homopolymer and other polymers mentioned above. The sealant layer may additionally or alternatively include materials selected from one or more of ethylene propylene random copolymers, low density polyethylene, linear low density polyethylene, medium density polyethylene, or combinations thereof.

Propylene- or Ethylene-Based Elastomers.

In addition to the polymers above, the sealant layer may also include 0.5 wt % to 10 wt % or 20 wt % or 30 wt % or 40 wt % or 50.0 wt % of a propylene- or ethylene-based elastomer. More preferably, when present the heat sealable layer includes 2.0 wt % to 35.0 wt %, 5.0 wt % to 20.0 wt %, or 7.5 wt % to 15.0 wt % of the propylene- or ethylene-based elastomer. Preferably, the propylene-based elastomer has an isotactic propylene triad tacticity of from 65% to 95%, a peak $T_m$ by DSC less than 110° C. or 100° C. or 90° C. or 80° C., or within a range of from 10° C. or 20° C. to 80° C. or 90° C. or 100° C. or 110° C., a heat of fusion of from 5 J/g to 50 or 60 or 70 or 80 or 100 J/g, and comprises:

(1) propylene-derived units in an amount of at least 75 wt %;

(2) ethylene-derived units in an amount of within the range of from 6 wt % or 8 wt % or 10 wt % to 12 wt % or 18 wt % or 22 wt % or 25 wt %; based on the combined weight of components (1), (2), and (3); and (3) optionally, 10 wt % or less of diene-derived units, wherein each of the above amounts is based on the combined weight of components (1), (2), and (3).

Some propylene-based elastomers have a single-peak melting transition as determined by DSC. Some propylene-based elastomers have a primary peak melting transition from less than 90° C., with a broad end-of-melt transition from greater than 110° C. The "peak $T_m$" is defined as the temperature of the greatest heat absorption within the range of melting of the sample. However, the propylene-based elastomer may show secondary melting peaks adjacent to the principal peak, and/or the end-of-melt transition, but for purposes herein, such secondary melting peaks are considered together as a single melting point, with the highest of these peaks being considered the $T_m$ of the propylene-based elastomer. Some propylene-based elastomers may not have a discernable melting peak. The procedure for DSC determinations is described in those earlier patents that describe such propylene-based elastomers and is known in the art.

Preferably, the propylene-based elastomers have a triad tacticity of three propylene units, as measured by $^{13}$C NMR, from greater than 75%, or 80%, or 82%, or 85%, or 90%. In one embodiment, the triad tacticity is within the range from 50% to 99%, and from 60% to 99% in another embodiment, and from 75% to 99% in yet another embodiment, and from 80% to 99% in yet another embodiment, and from 60% to 97% in yet another embodiment. Triad tacticity is determined as follows: The tacticity index, expressed herein as "m/r", is determined by $^{13}$C nuclear magnetic resonance (NMR). The tacticity index m/r is calculated as defined by H. N. Cheng in 17 MACROMOLECULES 1950 (1984). The designation "m" or "r" describes the stereochemistry of pairs of contiguous propylene groups, "m" referring to meso and "r" to racemic. An m/r ratio of 1.0 generally describes a syndiotactic polymer and an m/r ratio of 2.0 an atactic material. An isotactic material theoretically may have a ratio approaching infinity, and many by-product atactic polymers have sufficient isotactic content to result in ratios from greater than 50. Embodiments of the propylene-based elastomer have a tacticity index m/r within the range from 4 or 6 to 8 or 10 or 12.

Preferably, the propylene-based elastomers have a heat of fusion ($H_f$), determined according to the Differential Scanning calorimetry (DSC) procedure described herein, of less than 75.0 or 65.0 or 55.0 or 50.0 J/g. In certain embodiments, the $H_f$ value is within the range from 0.5, 1.0, or 5.0 J/g to 35.0, 40.0, 50.0, 65.0, or 75.0 J/g.

Preferably, the propylene-based elastomers have a percent crystallinity within the range from 0.5% to 40%, and from 1% to 30% in another embodiment, and from 5% to 25% in yet another embodiment, wherein "percent crystallinity" is determined according to the DSC procedure described herein. The thermal energy for the highest order of polypropylene is estimated at 189 J/g (i.e., 100% crystallinity is equal to 189 J/g). In another embodiment, the propylene-based elastomer has a percent crystallinity less than 40%, or 25%, or 22%, or 20%.

Preferably, the propylene-based elastomers have a density within the range from 0.840 g/cm$^3$ to 0.920 g/cm$^3$, and from 0.845 g/cm$^3$ to 0.900 g/cm$^3$ in another embodiment, and from 0.850 g/cm$^3$ to 0.890 g/cm$^3$ in yet another embodiment, the values measured at room temperature per the ASTM D-1505 test method.

Preferably, the propylene-based elastomers have a Shore A hardness (ASTM D2240) within the range from 10, or 20 to 80, or 90 Shore A. In yet another embodiment, the propylene-based elastomers possess an Ultimate Elongation of greater than 500%, or 1000%, or 2000%; and within the range from 300%, or 400%, or 500% to 800%, or 1200%, or 1800%, or 2000%, or 3000% in other embodiments.

Preferably, the propylene-based elastomers have a melt flow rate ("MFR," ASTM D1238, 2.16 kg, 230° C.), less than 90, or 70, or 50, or 40, or 30, or 20, or 10 dg/min. In some embodiments, the lower limit on the MFR is 0.1, 0.5, 1.0, 5.0, 10.0, 20.0, 30.0, 40.0, 50.0, 70.0, or 90.0 dg/min in other embodiments.

Preferably, the molecular weight distribution (MWD) of the propylene-based elastomers is within the range from 1.5, or 1.8, or 2.0 to 3.0, or 3.5, or 4.0, or 5.0, or 10.0 in particular embodiments. Techniques for determining the molecular weight (Mn, Mz, and Mw) and molecular weight distribution (MWD) are as follows, and as by Verstate et al. in 21 MACROMOLECULES 3360 (1988). Conditions described herein govern over published test conditions. Molecular weight and molecular weight distribution are measured using a Waters 150 gel permeation chromatograph equipped with a Chromatix KMX-6 on-line light scattering photometer. The system is used at 135° C. with 1,2,4-trichlorobenzene as the mobile phase. Showdex™ (Showa-Denko America, Inc.) polystyrene gel columns 802, 803, 804, and 805 are used. This technique is discussed in LIQUID CHROMATOGRAPHY OF POLYMERS AND RELATED MATERIALS III 207 (J. Cazes ed., Marcel Dekker, 1981).

Preferred propylene-based polyolefin polymers are available commercially under the trade names Vistamaxx™ (ExxonMobil Chemical Company, Houston, Tex., USA) and Versify™ (The Dow Chemical Company, Midland, Mich., USA). Suitable metallocene-catalyzed propylene-ethylene copolymers include ExxonMobil Chemical's Vistamaxx™ series of elastomers, particularly Vistamaxx™ 3020, Vistamaxx™ 3980, and Vistamaxx™ 6120. Other suitable EP elastomers include Dow Chemical's Versify™ elastomers, particularly grades DP3200.01 having an ethylene content of 9 wt %, and Mitsui Chemical's Notio™ series having a $T_m$ of from 100° C. to 150° C., such as, PN-2070, PN-3560, PN-0040, and PN-2060.

Suitable ethylene-based elastomers include copolymers comprise greater than 50.0 wt % ethylene, and have up to 50 wt %, preferably 1 wt % to 35 wt %, even more preferably 1 wt % to 6 wt % of a $C_3$ to $C_{12}$ comonomer derived units. The ethylene-based elastomers preferably have a composition distribution breadth index (CDBI) above 90%, even more preferably above 95%. In another preferred embodiment, the ethylene-based elastomer has a density of 0.86 g/cm³ to 0.925 g/cm³ and a CDBI of over 90%, preferably between 95% and 99%. In another embodiment, the ethylene-based elastomer has a melt index of 0.1 to 100 dg/min, preferably 0.5 to 50 dg/min, more preferably 0.8 to 30 dg/min, according to ASTM D1238 at 190° C. under a load of 2.16 kg.

Composition Distribution Breadth Index ("CDBI") is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. For purposes of this description a homopolymer is defined to have a CDBI of 100%.

The $C_3$ to $C_{12}$ olefin comonomers for the ethylene-based elastomers described above may be any polymerizable olefin monomer and are preferably a linear, branched, or cyclic olefin, even more preferably an alpha-olefin. Examples of suitable olefins include propylene, butylene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isododecene, 4-methyl-1-pentene, 3-methyl-pentene-1,3,5,5-trimethyl-1-hexene. Suitable comonomers also include dienes, trienes, and styrenic monomers. Preferred examples include styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene. Preferred comonomers for the copolymer of ethylene are propylene, butylene, hexene, and/or octene.

The ethylene-based elastomers described above may also contain termonomers and tetramonomers which may be one or more of the $C_3$ to $C_{20}$ olefins described above, any $C_4$ to $C_{20}$ linear, cyclic or branched dienes or trienes and any styrenic monomers, such as styrene, alpha-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene, and heptadiene.

In a preferred embodiment, the ethylene-based elastomers described above are metallocene polyethylenes (mPE's). The mPE homopolymers or copolymers may be produced using mono- or bis-cyclopentadienyl transition metal catalysts in combination with an activator of alumoxane and/or a non-coordinating anion in solution, slurry, high pressure, or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradename Exact™. Another suitable ethylene-based copolymer is Infuse™ olefin block copolymers (available from Dow Chemical); also, Tafmer™ (Mitsui Chemical) may also be useful.

Preferably, the ethylene-based elastomer includes units derived from butylene and has a density of 0.870 g/cm³ to 0.900 g/cm³, a melt index (according to ASTM D1238 at 190° C., 2.16 kg) of 1 to 10.0 dg/min, particularly, 2.0 to 6.0 dg/min, and a DSC $T_m$ within the range of from 30° C. or 40° C. to 60° C. or 70° C. or 80° C., and is present in an amount of 5.0 wt % to 15.0 wt % based on the total weight of components in the heat sealable skin layer.

The thickness of the sealant layer is typically in the range of 0.1 μm to 7 μm, or 0.5 μm to 4 μm, or preferably 0.75 μm to 2 μm. In some film embodiments, the thickness of the sealant layer may be in the range of 0.1 μm to 2 μm, or 0.1 μm to 0.5 μm.

The sealant layer may further comprise additives, such as, for example, anti-block agents, anti-static agents, slip agents, and combinations thereof.

Treating the Film and Use of Coating

The sealant layer is preferably high-energy treated to increase its surface energy to greater than 30 or 35 or 40 or 45 dynes/cm. Any desirable technique may be used that is known in the art such as corona, plasma, flame, chemical (sacrificial, e.g., acid or peroxide), or other oxidative treatment. The gas that is used in the high-energy treatment can be air, or can be pure nitrogen, argon, water vapor, oxygen or carbon dioxide, or can be a mixture of any of these, preferably a mixture of nitrogen and oxygen, the oxygen present from 0.1% or 0.2% to 5% or 10% or 20% of the mixture. The pretreatment is most preferably performed after orienting the film and before coating the film.

The film can be coated by any suitable means. The film is most preferably coated after it has been oriented. Preferably, the coating is applied to a film using a gravure coater, the coating composition having a solids level within the range of from 0.5 wt % or 1.0 wt % to 4 wt % or 5 wt % or 6 wt %. The solids are well mixed and kept mixed to ensure uniformity. When a primer is used on the film, the primer may be similarly applied. Preferably, the primer is applied directly to the film, dried, then the PAI condensation product then applied and dried. The coated film can then be exposed to heat, such as by placing in an oven, to evaporate the diluent used to dissolve and/or emulsify the coating materials.

In certain embodiments, an un-modified PAI is used as a primer layer between the first layer of the film and the condensation product coating. In a preferred embodiment, when a PAI (un-modified) is used as a primer, its weight average molecular weight of from 20,000 to 80,000 or 100,000 or 150,000 or 200,000 or 500,000 g/mol.

The PAI condensation product does not need to be radiation (preferably ultraviolet light) cured, and preferably is not UV cured prior to printing. Most preferably, however, the coating is UV cured. The preferred radiation is of UV wavelengths within the range of from 10 or 50 or 100 nm to 300 or 350 or 400 nm. As an example of curing, the film is coated, dried, then exposed to UV radiation under a lamp, the film passing close to the UV source at a rate of from 20 or 30 or 40 or 50 or 60 ft/min to 110 or 120 or 150 or 200 ft/min. Preferably, the film is passed once, twice, three, four, five, or six times passed the UV source, meaning that the film is exposed to the UV source at a given rate, then moved away from the source for seconds or minutes, followed by another "pass" near the source. After printing, the film may be passed once, twice, three, or more times near the UV source.

Any one or all of the layers may have certain additives included with the primary polymer materials used to make the layers. The condensation product coating may also comprise similar additives. In a particular embodiment, however, anti-blocking agents are substantially absent from the coating. Anti-block agents can be an actual film layer such as polyethylene, but can also be an additive to a film layer such as silica or other additive as is known in the art. In any case, when present, the condensation product coating comprises from 1 wt % or 5 wt % or 10 wt % to 20 wt % or 30 wt % or 40 wt % or 50 wt % anti-block agent. With or without the oxidation treatment or anti-blocking agents, in certain embodiments the coefficient of friction of the coated film is less than 1 or 0.8 or 0.5 or 0.4.

In any case, other "additives" that may go into any one or more layers of the matte film include compositions such as cavitating agents (e.g., $CaCO_3$), opacifying agents, pigments, colorants, slip agents, antioxidants, anti-fog agents, antistatic agents, fine inorganic solids, moisture barrier additives, gas barrier additives, and combinations thereof, as discussed in further detail below. Preferably, the total amount of additives, including cavitating agents, in the first skin layer ranges from 0.2 wt % or 0.5 wt % to 2 wt % or 4 wt % or 8 wt % or 10 wt % or 20 wt % or 40 wt %. In certain embodiments, the anti-block is not an additive but is a high-energy treatment of the skin surface such as a plasma, corona, or flame treatment as is known in the art.

Preferably, primers are present in the coated films; but may also be absent. Most preferably, the primary component of the primer is the same or similar to the coating polymer, but with other additives. Most preferably, PAIs are used as primers. In certain embodiments, the primer consists essentially of a PAI as described herein.

The coated films described herein have many uses, but are particularly desirable in labels, such as adhesive labels, especially thermal transfer ribbon ("TTR") labels for printing and attaching to articles of manufacture, and most preferably pressure sensitive labels where printing is required. Most preferably, the inventive films are coated on the side of the film to be printed upon, or "print side" of the film.

A thermal transfer printer is a printer which prints on paper or similar material by melting a coating of ribbon so that it stays glued to the material on which the print is applied. It contrasts with direct thermal printing where no ribbon is present in the process. Usage of thermal transfer printers in industry includes barcode labels (as labels printed with thermal printers tend not to last long), or for marking clothing labels (shirt size, etc.); and in printing plastic labels for chemical containers. Barcode printers typically come in fixed sizes of 4 inches, 6 inches, or 8 inches wide. Although a number of manufacturers have made differing sizes in the past, most have now standardized on these sizes. The main application for these printers is to produce barcode, especially UPC labels for product and shipping identification.

Thermal transfer printers use a fixed width thermal print head, pressing onto a paper or plastic label, over a driven rubber roller called a platen. Between the print head and the label is sandwiched a very thin thermal transfer ribbon (or sometimes called "foil"), which is a polymer film which has been coated on the label side with a wax, wax-resin, or pure resin "ink". The unique PAI condensation products can be tailored depending on the nature of the wax or ink, such as with more or less fine inorganic solids, emulsifier, or the nature of the PAI condensation polymer itself can be tailored. In any case, the ribbon is spooled onto reels up to 625 meters (1965 feet) long and is driven through the printing mechanism in sync with the labels, at speeds of up to 12 inches per second (although 6 inches per second is adequate for most applications). A few specialized printers will unload the head pressure and stop advancing the ribbon when there are longer unprinted label areas to be fed through to reduce ribbon consumption, this complexity is only warranted for large volume applications but can make the ribbon stock run out partway through a label roll whereas normally a ribbon will be finished after an integer number of label rolls.

The usefulness of the invention is demonstrated in the following non-limiting examples.

EXAMPLES

Coated Film Preparation

A biaxially oriented base film having one matte surface and one glossy surface was prepared with the following layer structure: A/B/C/D/E, wherein "C" is the core layer of ExxonMobil 4612 polypropylene homopolymer and cavitating agent, "A" is the sealant layer comprising JPC 7320 EPB terpolymer ($T_m$ of 146° C., Elongation of 870%, Modulus of 690 MPa to 710 MPa, MFR of 7 g/10 min (2.16/190° C.), all per ASTM), "D" is a tie layer of ExxonMobil 4612 polypropylene homopolymer, "E" is an outer skin layer have Total 3453 HD, while the "B" layer is the matte layer comprising masterbatch resin that is made up of HDPE, PP, and EPB terpolymer in 10:30:60 proportions. The film is biaxially oriented and corona treated on the sealant face to about 40 dynes/cm surface energy.

The film was coated with an aqueous mixture of materials as in Table 1 in four samples. The surfactant was Surfynol™ 440, the polyethylene (PE) emulsion was MichemEmulsion™ 91240G.E, and the calcium carbonate is Multifex™ MM. A 5% dispersion of Multifex MM (ultra-fine calcium carbonate, 70 nm average particle size, from Specialty Minerals, Inc.) was prepared by mixing the powder and water followed by high-shear mixing: Total volume prepared: 200 mL in an 8 oz. wide mouth jar; 5000 rpm for 3 min on Silverson mixer. After high-shear dispersion, the white liquid was kept under agitation with a Teflon-coated magnetic stirring bar until added to the formulations indicated above.

The condensation polymer (PAI-AAEM condensation polymer) was prepared by dissolving 7 g (100 phr) Epomin P1050 from Nippon Shokubai, a polyethyleneimine having a $M_w$ of 70,000 g/mol, in 176 g deionized water. After dissolution was complete, 16.3 g acetoacetoxyethyl methacrylate (AAEM) was added to the solution that was being stirred vigorously enough to create a vortex at 500 rpm. The mixture was stirred for 24 hours and then removed from agitation. One day later the condensation polymer was formulated into the blends shown above and then coated onto the matte surface of the substrate on the same day with a 200-Quad gravure cylinder at about 40 fpm. The substrate surface was corona treated in line, immediately prior to the application of the coatings.

The approximate dry coating weight for coatings applied at 3% solids is 0.084 g/m². Coatings applied at 4% solids would have an approximate dry coating weight of 0.112 g/m². The dried coating on a polymeric film is "adhered" to the film as is understood in the art and is preferably resistant to water and maintain its adherence.

Printability Tests:

A Little Joe™ proofing press was used to apply Flexocure-Gemini cyan ink from Akzo Nobel Inks AB in Trelleborg, Sweden to the coated matte films. After applying the ink, it was cured by passing the printed sample twice under the UV curing lamp in an apparatus built by Fusion Systems™ at 100 feet per minute.

To simulate print performance in the first station of a multi-station printing press, samples were printed with ink on test surfaces that had no prior exposure to UV light followed by two passes under the UV lamp to cure the ink. This is the "0-Ink-2" curing protocol. To simulate print performance in one of the latter stations of a multi-station printing press, test surfaces were passed five times under the UV lamp at 100 feet per minute prior to the application of ink (followed by an additional two passes to cure the ink). This is the "5-Ink-2" curing protocol.

After samples were printed, initial ink adhesion was tested using three strips of f-inch wide Scotch™ 600 tape laid across a 3×3-inch patch of the printed substrate and air bubbles were pressed out by hand. After leaving the tape on the surface for 1 to 2 minutes, each strip of tape is rapidly peeled off. Samples were rated on the percentage of ink left on the entire 3×3 block after all three pieces of tape have been removed. The amount of ink remaining was recorded as the % INK.

Retained ink adhesion after immersion was tested in a similar fashion, but two different tapes were used and the dwell times were a little shorter. Printed samples were prepared using both curing protocols as described previously. After waiting four to seven days, samples were immersed for 24±4 hours in deionized water. After patting the sample dry with a paper towel, three strips of 1-inch wide Scotch™ 610 were quickly applied to cover the entire 3×3 inch printed surface. After a dwell time of between 10 and 30 seconds, the tape was quickly removed, and then three 1-inch strips of Scotch™ 600 tape were immediately applied to the same printed area on the sample. After a dwell time of between 10 and 30 seconds, the Scotch™ 600 tape was quickly peeled off. The amount of ink left after being tested with both tapes was recorded as % INK-W in Table 2.

All of the printability test results summarized in Table 2 were very good. % INK-W was somewhat better for samples that contained calcium carbonate, but, all the samples could conceivably be useful, depending upon the desired end-use applications.

TABLE 1

Example Formulation, wet and (dry), using the Condensation Polymer Coatings

| Sample No. | condensation polymer, wt % | surfactant, wt % | PE emulsion, wt % | CaCO₃, wt % | water, wt % | coat solids, % |
|---|---|---|---|---|---|---|
| 1 | 15 (49) | 0.05 (2) | 3.7 (49) | 0 (0) | 82 | 3.00 |
| 2 | 12 (39) | 0.05 (2) | 3.0 (39) | 12 (20) | 73 | 3.00 |
| 3 | 20 (49) | 0.05 (2) | 4.9 (49) | 0 (0) | 75 | 4.00 |
| 4 | 16 (39) | 0.05 (2) | 4.0 (39) | 16 (20) | 64 | 4.00 |

TABLE 2

Printing Test Results

| Sample No. | % solids | % INK (0-ink-2) | % INK-W (0-ink-2) | % INK (5-ink-2) | % INK-W (5-ink-2) | Coating weight, g/m² |
|---|---|---|---|---|---|---|
| 1 | 3.0 | 98 | 100 | 100 | 77 | 0.084 |
| 2 | 3.0 | 99 | 99 | 100 | 97 | 0.084 |
| 3 | 4.0 | 98 | 100 | 100 | 66 | 0.112 |
| 4 | 4.0 | 94 | 98 | 100 | 97 | 0.112 |

Thermal Transfer Print Testing.

The same set of samples from above was evaluated for TTR printability as described in Tables 3a and 3b. Again, depending upon specific end-use requirements, all the samples could be useful. Samples 3 and 4 yielded acceptable TTR printability on nine of ten thermal transfer ribbons tested. Samples 1 and 2 demonstrated acceptable printability on eight of ten thermal transfer ribbons tested. Note in Table 3a that 10 mil non-rotated bar code smudge tested, the print temperature for the Zebra printer was 1 to 30, and for the TEC was from −10 to +10. Blanks in the data indicate that the ribbons printed poorly.

Further testing on the durability of the coated matte film samples was performed. The tests were carried out as follows, the results of which are summarized in Tables 6a and 6b.

Testing Descriptions—American National Standards Institute—ANSI.

ANSI's "Barcode Print Quality Guideline", established a procedure for measuring barcode quality. The ANSI guideline provides a standard measurement methodology and defines eight categories of print quality to be measured. The output of the ANSI method is a grade for any barcode on a scale of 0 to 4 or expressed as a letter grade (A, B, C, D, or F) based on the measurements in each category using a laser scanner. The scale is reproduced in Table 4. A grade of "C" or better should scan on virtually any properly maintained scanner on the first pass. Since better quality labels will scan more easily and allow more margin of error, some package purchasers even specify grade "B" or better codes.

Testing Protocol

ANSI scan before smudge—(barcode type 39—narrow) was printed using the designated TTR (Thermal Transfer Printer) and designated TTR ribbon at a speed of 6 ips (inches per second). The image was scanned using a scanner equipped with the ANSI grading capability. The barcode was scanned as is.

ANSI scan after smudge—a 500 gram stylus with crock meter fabric was dragged across the surface of the non-rotated barcode. For TTR wax and wax resin ribbons 50 full strokes were used. For TTR resin ribbons 100 full strokes were used. The ANSI scan rating was taken afterwards. Crock Resistant scale is reproduced in Table 5.

ANSI scan after scratch—a steel ball stylus with a 200 gram weight was utilized to simulate scratching the label—50 strokes for the wax and wax/resin TTR ribbons, and again 100 strokes for TTR resin ribbons.

The rotated barcode was ANSI scan barcode rated as is after printing.

For the data in Table 6 the following test definitions apply:

Sample V1—an approximate 10 g/m² coating weight material—mineral filled with binder. A leading product in the market;

Sample V12—an approximate 2 g/m² coating weight material—mineral filled with acrylic binders. A sample produced by ExxonMobil; and Inventive sample 4—this is the invention prototype—an approximate 0.1 g/m² non-mineral filed coating on the matte white base film.

Tests referenced in column headings in data Tables 6a and 6b, which follows:

TTR ribbon by DNP IMS Company;

Type—wax, wax/resin blend, or resin formulated ribbon;

Printer—Brand and model (these are typical commercial printers);

Heat setting (darkness setting)—typically a higher number equals higher temperature of the print head. For the near edge printer the scale is centered at zero—therefore negative numbers are cooler, positive numbers are higher;

PRINT ANSI SCAN—Excellent—A or B Scan by ANSI rating on the as is printed label in the fence position on the narrow—style number 39 barcode. The rotated barcode is the ladder position;

SMUDGE ANSI SCAN (Smudge Resistance: the ability of the image to withstand repeated rubbing with a blunt or flat object.)—Excellent—A or B Scan by ANSI rating on the as is printed label in the fence position on the narrow—style number 39 barcode. The rotated barcode is the ladder position;

"IS SMUDGE/ABRASION OF LABEL STOCK VISIBLE? YES OR NO"—visual inspection of the label stock surface—after 100 strokes with the crock cloth on wax or wax/resin type printed samples is the surface of the label stock visibly abraded or smeared. When Resin type ribbons are used on the sample 200 strokes is tested;

"IS SMUDGE/ABRASION OF BAR CODE VISIBLE? YES OR NO"—visual inspection of the printed barcode surface—after 100 strokes with the crock cloth on wax or wax/resin type printed samples is the surface of the label stock visibly abraded or smeared. When Resin type ribbons are used on the sample 200 strokes is tested;

SCRATCH OF LABEL STOCK ANSI SCAN (Scratch Resistance: the ability of the image to withstand repeated rubbing with a sharp or pointed object or stylus)—visual inspection of the label stock surface—after 100 strokes with the crock cloth on wax or wax/resin type printed samples is the surface of the label stock visibly abraded or scratched. When Resin type ribbons are used on the sample 200 strokes is tested;

"IS SCRATCH LINE ON LABEL STOCK VISIBLE? YES OR NO"—visual inspection of the label stock surface—after 100 strokes with the crock cloth on wax or wax/resin type printed samples is the surface of the label stock visibly abraded or scratched. When Resin type ribbons are used on the sample 200 strokes is tested;

"IS SCRATCH LINE ON BAR CODE VISIBLE? YES OR NO"—visual inspection of the barcode surface—after 100 strokes with the crock cloth on wax or wax/resin type printed samples is the surface of the barcode visibly abraded or scratched. When Resin type ribbons are used on the sample 200 strokes is tested;

"TTR PRINT SPEED IPS"—all at 6 inches/sec; and

SCRATCH RESISTANCE GRADE—the following grading scale criteria was used to rate the samples.

TABLE 3a

TTR Testing of Samples

| LABEL | Sample 1 | | | | | | | | | |
|---|---|---|---|---|---|---|---|---|---|---|
| RIBBON | TR4085plus | TRX-50 | TRX-55 | M260 | TR4070 | R300 | R316 | R510 | TR4500 | R390 |
| RIBBON TYPE | Wax | Wax/Resin | | | Resin | | | | Near Edge Wax/Resin | Near Edge Resin |
| PRINTER | Zebra 140 XI III | | | | | | | | TEC B-SX4T | |
| PRINT TEMPERATURE | 5 | | | 6 | 22 | 20 | 13 | 20 | −2 | 0 |
| PRINT SPEED | 6 IPS | 6 IPS | 6 IPS | 6 IPS | 6 IPS | 6 IPS | 6 IPS | 6 IPS | 6 IPS | 6 IPS |
| DENSITY | 1.93 | — | — | 1.72 | 1.83 | 1.89 | 1.86 | 2.26 | 1.67 | 1.9 |
| ANSI SCAN BEFORE SMUDGE | B | — | — | B | B | B | B | B | B | B |
| ANSI SCAN AFTER SMUDGE | B | — | — | B | B | B | B | B | B | B |
| ANSI SCAN BEFORE SCRATCH | B | — | — | B | B | B | B | B | B | B |
| ANSI SCAN AFTER SCRATCH | B | — | — | B | B | B | B | B | C | C |
| ANSI SCAN ROTATED BAR CODE | B | — | — | A | A | B | B | A | B | B |
| LABEL | Sample 2 | | | | | | | | | |
| RIBBON | TR4085plus | TRX-50 | TRX-55 | M260 | TR4070 | R300 | R316 | R510 | TR4500 | R390 |
| RIBBON TYPE | Wax | Wax/Resin | | | Resin | | | | Near Edge Wax/Resin | Near Edge Resin |
| PRINTER | Zebra 140 XI III | | | | | | | | TEC B-SX4T | |
| PRINT TEMPERATURE | 5 | | | 6 | 21 | 20 | 13 | 20 | −2 | 0 |
| PRINT SPEED | 6 IPS | 6 IPS | 6 IPS | 6 IPS | 6 IPS | 6 IPS | 6 IPS | 6 IPS | 6 IPS | 6 IPS |
| DENSITY | 1.91 | — | — | 1.74 | 1.89 | 1.86 | 1.9 | 2.25 | 1.66 | 1.91 |
| ANSI SCAN BEFORE SMUDGE | B | — | — | B | B | B | B | B | B | B |
| ANSI SCAN AFTER SMUDGE | C | — | — | B | B | B | B | B | B | B |
| ANSI SCAN BEFORE SCRATCH | B | — | — | B | B | B | B | B | B | B |
| ANSI SCAN AFTER SCRATCH | B | — | — | B | B | B | B | B | B | B |
| ANSI SCAN ROTATED BAR CODE | B | — | — | A | B | B | B | B | B | B |

TABLE 3b

TTR Testing Results

| LABEL | Sample 3 | | | | | | | | | |
|---|---|---|---|---|---|---|---|---|---|---|
| RIBBON | TR4085plus | TRX-50 | TRX-55 | M260 | TR4070 | R300 | R316 | R510 | TR4500 | R390 |
| RIBBON TYPE | Wax | Wax/Resin | | | Resin | | | | Near Edge Wax/Resin | Near Edge Resin |
| PRINTER | Zebra 140 XI III | | | | | | | | TEC B-SX4T | |
| PRINT TEMPERATURE | 6 | 6 | | 5 | 21 | 18 | 14 | 20 | −2 | −1 |
| PRINT SPEED | 6 IPS | 6 IPS | 6 IPS | 6 IPS | 6 IPS | 6 IPS | 6 IPS | 6 IPS | 6 IPS | 6 IPS |
| DENSITY | 2.09 | 2.04 | — | 1.74 | 1.9 | 1.81 | 1.95 | 2.26 | 1.67 | 1.87 |

TABLE 3b-continued

TTR Testing Results

| | | | | | | | | | | |
|---|---|---|---|---|---|---|---|---|---|---|
| ANSI SCAN BEFORE SMUDGE | B | B | — | B | B | B | B | B | B | B |
| ANSI SCAN AFTER SMUDGE | B | B | — | B | B | B | B | B | B | C |
| ANSI SCAN BEFORE SCRATCH | B | B | — | B | B | B | B | B | B | B |
| ANSI SCAN AFTER SCRATCH | B | B | — | B | B | B | B | B | B | B |
| ANSI SCAN ROTATED BAR CODE | B | B | — | A | B | B | C | B | B | B |

| | | | | Sample 4 | | | | | | |
|---|---|---|---|---|---|---|---|---|---|---|
| LABEL | | | | | | | | | | |
| RIBBON | TR4085plus | TRX-50 | TRX-55 | M260 | TR4070 | R300 | R316 | R510 | TR4500 | R390 |
| RIBBON TYPE | Wax | Wax/Resin | | | Resin | | | | Near Edge Wax/Resin | Near Edge Resin |
| PRINTER | Zebra 140 XI III | | | | | | | | TEC B-SX4T | |
| PRINT TEMPERATURE | 5 | 7 | | 5 | 22 | 19 | 12 | 20 | −3 | −1 |
| PRINT SPEED | 6 IPS | 6 IPS | 6 IPS | 6 IPS | 6 IPS | 6 IPS | 6 IPS | 6 IPS | 6 IPS | 6 IPS |
| DENSITY | 2.09 | 2.04 | — | 1.72 | 1.87 | 1.85 | 1.85 | 2.28 | 1.66 | 1.88 |
| ANSI SCAN BEFORE SMUDGE | B | B | — | B | B | B | B | B | B | B |
| ANSI SCAN AFTER SMUDGE | B | B | — | B | B | B | B | B | B | B |
| ANSI SCAN BEFORE SCRATCH | B | B | — | B | B | B | B | B | B | B |
| ANSI SCAN AFTER SCRATCH | B | B | — | B | B | B | B | B | C | B |
| ANSI SCAN ROTATED BAR CODE | B | B | — | B | B | B | C | B | C | C |

TABLE 4

Rating Scale for Scratch Resistance

| Original ANSI Grade | ANSI Grade After Scratch Test | Scratch Resistance Grade |
|---|---|---|
| A | A | 5 |
| A | B | 4 |
| A | C | 3 |
| A | D | 2 |
| A | F | 1 |
| A | No scan | 0 |
| B | B | 5 |
| B | C | 4 |
| B | D | 3 |
| B | F | 2 |
| B | No scan | 0 |
| C | C | 5 |
| C | D | 4 |
| C | F | 3 |
| C | No scan | 0 |
| D | D | 5 |
| D | F | 4 |
| D | No scan | 0 |
| F | F | 5 |
| F | No scan | 0 |

TABLE 5

Crock Resistance Rating

| Amount of ink transferred to Crocking Cloth | Crock Resistance Rating |
|---|---|
| None | 5 |
| Slight/trace | 4 |
| Moderate | 3 |
| Heavy | 2 |
| All/most | 1 |

TABLE 6

TTR Testing of Commercial and Inventive coated films

Table 6a

| FILM | PRINTER | TYPE | TT RIBBON | TYPE | PRINTER | HEAT SETTING | PRINT ANSI SCAN | SMUDGE ANSI SCAN |
|---|---|---|---|---|---|---|---|---|
| V12 | ZEBRA 140 XI III | FLAT | M260 | WAX/RESIN | Zebra 140xi III | 8 | EXCELLENT | EXCELLENT |
| V12 | ZEBRA 140 XI III | FLAT | R300 | RESIN | Zebra 140xi III | 22 | EXCELLENT | EXCELLENT |
| V12 | ZEBRA 140 XI III | FLAT | R316 | RESIN | Zebra 140xi III | 10 | EXCELLENT | EXCELLENT |
| V12 | TEC B-SX4T | NEAR EDGE | R390 | RESIN | TEC B-SX4T | NOT PRINTABLE | NOT PRINTABLE | NOT PRINTABLE |
| V12 | ZEBRA 140 XI III | | R510 | NO PRINT | Zebra 140xi III | NOT PRINTABLE | NOT PRINTABLE | NOT PRINTABLE |
| V12 | ZEBRA 140 XI III | FLAT | TR4070 | RESIN | Zebra 140xi III | 25 | EXCELLENT | EXCELLENT |
| V12 | ZEBRA 140 XI III | FLAT | TR4085PLUS | WAX | Zebra 140xi III | 9 | EXCELLENT | EXCELLENT |
| V12 | TEC B-SX4T | NEAR EDGE | TR4500 | RESIN | TEC B-SX4T | 0 | EXCELLENT | EXCELLENT |
| V12 | ZEBRA 140 XI III | FLAT | TRX50 | WAX/RESIN | Zebra 140xi III | NOT PRINTABLE | NOT PRINTABLE | NOT PRINTABLE |

TABLE 6-continued

TTR Testing of Commercial and Inventive coated films

| | | | | | | | | |
|---|---|---|---|---|---|---|---|---|
| V12 | ZEBRA 140 XI III | FLAT | TRX55 | WAX/RESIN | Zebra 140xi III | 10 | EXCELLENT | EXCELLENT |
| V1 | ZEBRA 140 XI III | FLAT | M260 | WAX/RESIN | Zebra 140xi III | 9 | EXCELLENT | EXCELLENT |
| V1 | ZEBRA 140 XI III | FLAT | R300 | RESIN | Zebra 140xi III | 25 | EXCELLENT | EXCELLENT |
| V1 | ZEBRA 140 XI III | FLAT | R316 | RESIN | Zebra 140xi III | 16 | EXCELLENT | EXCELLENT |
| V1 | TEC B-SX4T | NEAR EDGE | R390 | RESIN | TEC B-SX4T | NOT PRINTABLE | NOT PRINTABLE | NOT PRINTABLE |
| V1 | ZEBRA 140 XI III | | R510 | NO PRINT | Zebra 140xi III | NOT PRINTABLE | NOT PRINTABLE | NOT PRINTABLE |
| V1 | ZEBRA 140 XI III | FLAT | TR4070 | RESIN | Zebra 140xi III | NOT PRINTABLE | NOT PRINTABLE | NOT PRINTABLE |
| V1 | ZEBRA 140 XI III | FLAT | TR4085PLUS | WAX | Zebra 140xi III | 12 | EXCELLENT | EXCELLENT |
| V1 | TEC B-SX4T | NEAR EDGE | TR4500 | NOT PRINTABLE | TEC B-SX4T | NOT PRINTABLE | NOT PRINTABLE | NOT PRINTABLE |
| V1 | ZEBRA 140 XI III | FLAT | TRX50 | WAX/RESIN | Zebra 140xi III | 11 | EXCELLENT | EXCELLENT |
| V1 | ZEBRA 140 XI III | FLAT | TRX55 | WAX/RESIN | Zebra 140xi III | 13 | EXCELLENT | EXCELLENT |
| Sample 4 | ZEBRA 140 XI III | FLAT | M260 | WAX/RESIN | Zebra 140xi III | 5 | EXCELLENT | EXCELLENT |
| Sample 4 | ZEBRA 140 XI III | FLAT | R300 | RESIN | Zebra 140xi III | 19 | EXCELLENT | EXCELLENT |
| Sample 4 | ZEBRA 140 XI III | FLAT | R316 | RESIN | Zebra 140xi III | 12 | EXCELLENT | EXCELLENT |
| Sample 4 | TEC B-SX4T | NEAR EDGE | R390 | RESIN | TEC B-SX4T | −1 | EXCELLENT | EXCELLENT |
| Sample 4 | ZEBRA 140 XI III | FLAT | R510 | RESIN | Zebra 140xi III | 20 | EXCELLENT | EXCELLENT |
| Sample 4 | ZEBRA 140 XI III | FLAT | TR4070 | RESIN | Zebra 140xi III | 22 | EXCELLENT | EXCELLENT |
| Sample 4 | ZEBRA 140 XI III | FLAT | TR4085PLUS | WAX | Zebra 140xi III | 5 | EXCELLENT | EXCELLENT |
| Sample 4 | TEC B-SX4T | NEAR EDGE | TR4500 | RESIN | TEC B-SX4T | −3 | EXCELLENT | EXCELLENT |
| Sample 4 | ZEBRA 140 XI III | FLAT | TRX50 | WAX/RESIN | Zebra 140xi III | 7 | EXCELLENT | EXCELLENT |
| Sample 4 | ZEBRA 140 XI III | FLAT | TRX55 | WAX/RESIN | Zebra 140xi III | NOT PRINTABLE | NOT PRINTABLE | NOT PRINTABLE |

Table 6b

| FILM | PRINTER | IS SMUDGE/ABRASION OF LABEL STOCK VISIBLE? | IS SMUDGE/ABRASION OF BAR CODE VISIBLE? | SCRATCH OF LABEL STOCK ANSI SCAN | IS SCRATCH LINE ON BAR CODE VISIBLE | IS SCRATCH LINE ON LABEL STOCK VISIBLE | SCRATCH RESISTANCE GRADE | CROCK RESISTANCE RATING |
|---|---|---|---|---|---|---|---|---|
| V12 | ZEBRA 140 XI III | YES | YES | EXCELLENT | YES | YES | 5 | 4 |
| V12 | ZEBRA 140 XI III | YES | NO | EXCELLENT | YES | YES | 4 | 5 |
| V12 | ZEBRA 140 XI III | YES | NO | EXCELLENT | NO | YES | 3 | 5 |
| V12 | TEC B-SX4T | NOT PRINTABLE | NOT PRINTABLE | NOT PRINTABLE | NOT PRINTABLE | NOT PRINTABLE | NOT PRINTABLE | NOT PRINTABLE |
| V12 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V12 | ZEBRA 140 XI III | YES | NO | EXCELLENT | YES | YES | 4 | 5 |
| V12 | ZEBRA 140 XI III | YES | YES | EXCELLENT | YES | YES | 2 | 3 |
| V12 | TEC B-SX4T | YES | YES | GOOD | YES | YES | 3 | 4 |
| V12 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V12 | ZEBRA 140 XI III | YES | YES | GOOD | YES | YES | 3 | 4 |
| V1 | ZEBRA 140 XI III | YES | NO | EXCELLENT | YES | YES | 5 | 4 |

TABLE 6-continued

TTR Testing of Commercial and Inventive coated films

| V1 | ZEBRA 140 XI III | YES | NO | EXCELLENT | YES | YES | 5 | 5 |
| V1 | ZEBRA 140 XI III | YES | YES | EXCELLENT | YES | YES | 5 | 5 |
| V1 | TEC B-SX4T | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | YES | YES | EXCELLENT | YES | YES | 5 | 3 |
| V1 | TEC B-SX4T | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | YES | YES | EXCELLENT | YES | YES | 5 | 4 |
| V1 | ZEBRA 140 XI III | YES | YES | EXCELLENT | YES | YES | 4 | 4 |
| Sample 4 | ZEBRA 140 XI III | NO | NO | EXCELLENT | NO | NO | 5 | 3 |
| Sample 4 | ZEBRA 140 XI III | NO | NO | EXCELLENT | NO | NO | 5 | 5 |
| Sample 4 | ZEBRA 140 XI III | NO | NO | EXCELLENT | NO | NO | 5 | 5 |
| Sample 4 | TEC B-SX4T | NO | NO | EXCELLENT | NO | NO | 5 | 3 |
| Sample 4 | ZEBRA 140 XI III | NO | NO | EXCELLENT | NO | NO | 5 | 5 |
| Sample 4 | ZEBRA 140 XI III | NO | NO | EXCELLENT | YES | NO | 5 | 5 |
| Sample 4 | ZEBRA 140 XI III | NO | YES | EXCELLENT | YES | YES | 5 | 3 |
| Sample 4 | TEC B-SX4T | NO | NO | EXCELLENT | YES | NO | 4 | 4 |
| Sample 4 | ZEBRA 140 XI III | NO | NO | EXCELLENT | NO | NO | 5 | 4 |
| Sample 4 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |

TABLE 6b

TTR Testing of Commercial and Inventive coated films (continued)

| FILM | PRINTER | IS SMUDGE/ABRASION OF LABEL STOCK VISIBLE? | IS SMUDGE/ABRASION OF BAR CODE VISIBLE? | SCRATCH OF LABEL STOCK ANSI SCAN | IS SCRATCH LINE ON BAR CODE VISIBLE | IS SCRATCH LINE ON LABEL STOCK VISIBLE | SCRATCH RESISTANCE GRADE | CROCK RESISTANCE RATING |
|---|---|---|---|---|---|---|---|---|
| V12 | ZEBRA 140 XI III | YES | YES | EXCELLENT | YES | YES | 5 | 4 |
| V12 | ZEBRA 140 XI III | YES | NO | EXCELLENT | YES | YES | 4 | 5 |
| V12 | ZEBRA 140 XI III | YES | NO | EXCELLENT | NO | YES | 3 | 5 |
| V12 | TEC B-SX4T | NOT PRINTABLE | NOT PRINTABLE | NOT PRINTABLE | NOT PRINTABLE | NOT PRINTABLE | NOT PRINTABLE | NOT PRINTABLE |
| V12 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V12 | ZEBRA 140 XI III | YES | NO | EXCELLENT | YES | YES | 4 | 5 |
| V12 | ZEBRA 140 XI III | YES | YES | EXCELLENT | YES | YES | 2 | 3 |
| V12 | TEC B-SX4T | YES | YES | GOOD | YES | YES | 3 | 4 |
| V12 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | YES | YES | GOOD | YES | YES | 3 | 4 |
| V1 | ZEBRA 140 XI III | YES | NO | EXCELLENT | YES | YES | 5 | 5 |
| V1 | ZEBRA 140 XI III | YES | NO | EXCELLENT | YES | YES | 4 | 4 |
| V1 | ZEBRA 140 XI III | YES | YES | EXCELLENT | YES | YES | 5 | 5 |
| V1 | TEC B-SX4T | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | YES | YES | EXCELLENT | YES | YES | 5 | 5 |
| V1 | TEC B-SX4T | NOT PRINTABLE | NOT PRINTABLE | NOT PRINTABLE | NOT PRINTABLE | NOT PRINTABLE | NOT PRINTABLE | NOT PRINTABLE |
| V1 | ZEBRA 140 XI III | YES | YES | EXCELLENT | YES | YES | 5 | 4 |
| V1 | ZEBRA 140 XI III | YES | YES | EXCELLENT | NO | YES | 4 | 3 |
| Sample 4 | ZEBRA 140 XI III | NO | NO | EXCELLENT | NO | NO | 5 | 5 |
| Sample 4 | ZEBRA 140 XI III | NO | NO | EXCELLENT | NO | NO | 5 | 3 |
| Sample 4 | ZEBRA 140 XI III | NO | NO | EXCELLENT | NO | NO | 5 | 3 |
| Sample 4 | TEC B-SX4T | NO | NO | EXCELLENT | YES | YES | 5 | 5 |
| Sample 4 | ZEBRA 140 XI III | NO | NO | EXCELLENT | YES | YES | 5 | 3 |
| Sample 4 | ZEBRA 140 XI III | NO | YES | EXCELLENT | YES | YES | 5 | 3 |
| Sample 4 | TEC B-SX4T | NO | NO | EXCELLENT | YES | YES | 4 | 4 |
| Sample 4 | ZEBRA 140 XI III | NO | NO | EXCELLENT | NO | NO | 5 | 4 |
| Sample 4 | ZEBRA 140 XI III | NOT PRINTABLE | NOT PRINTABLE | NOT PRINTABLE | NOT PRINTABLE | NOT PRINTABLE | NOT PRINTABLE | NOT PRINTABLE |

Having described the various features of the condensation product, polymer, and films having such coating thereon, provided herein in numbered embodiments is:

1. A multi-layered matte film having a first and second side, comprising a coating on at least the first side, wherein the coating is the condensation product of a polyalkylimine and one or more amine-reactive molecules comprising at least one of:

$R^c$=C($R^a$)—(CX$_2$)$_j$—C(O)—(CX$_2$)$_k$—(O—[C$R^d_2$]$_q$)$_p$-A-C(O)—C($R^b$)=CX$_2$ or

Y—(CX$_2$)$_m$—(O—[C$R^d_2$]$_q$)$_p$-A-C(O)—C($R^b$)=CX$_2$ where Y is halogen or a three-membered oxirane ring; $R^a$ and $R^b$ are the same or different and are H or a $C_1$ to $C_6$ alkyl; $R^c$ is oxygen or $CX_2$; each X can be the same or different and is H, hydroxyl, halogen, or any organic radical containing at least one carbon atom, wherein each $R^d$ can be the same or different and are H or a $C_1$ to $C_6$ alkyl; A is oxygen or N$R^d$; C$R^d$ and C$R^d_2$ can each be a separate moiety or a portion of a cyclic structure; j, k, and m are integers ranging from 0 to 6, inclusive; q is an integer ranging from 1 to 6, inclusive; and p is an integer ranging from 0 to 30, inclusive;
    wherein the multi-layer matte film comprises at least a core layer of polypropylene, a sealant layer comprising the first side and a matte layer between the sealant layer and core layer.

2. A multi-layered matte film comprising:
    at last one layer of a coating comprising the condensation reaction product of the combination of a polyalkylimine and an acetoacetonate ("AcAc")-functional material or an oxirane-functional material, the acetoacetonate and oxirane-functional materials comprising an ethenic unsaturation group, the coating adhered to a sealant layer;
    a sealant layer comprising a polyolefin, having a $T_m$ within the range of from 120° C. to 170° C.; and a melt flow rate (ASTM 1238, 2.16 kg/230° C.) with the range of from 3 g/10 min to 20 g/10 min; and an elongation (ASTM D638) within the range of from 500% to 1200%; and a density of from 0.85 g/cm$^3$ to 0.94 g/cm$^3$ (ASTM D792); and a tensile strength at break (ASTM D638) within the range from 30 to 60 MPa; and a Flexural Modulus (ASTM D790) within the range from 500 to 1200 MPa;
    a core polypropylene layer; and
    a matte layer between the sealant layer and core layer, the matte layer comprising a blend of at least two incompatible polymers such that the Haze (ASTM D1003) is at least 50 or 60 or 70 or 80%.

3. The film of numbered embodiments 1 or 2, wherein the first and second sides of the film are coated with the polyalkylimine condensation product.

4. The film of any one of the previous numbered embodiments, wherein the coating comprises from 50 or 60 or 65 or 70 wt % to 75 or 80 or 85 or 90 or 95 wt % of the PAI condensation product; from 5 or 10 wt % to 20 or 30 or 40 or 50 wt % fine inorganic solid, each based on the total weight of the coating.

5. The film of any one of the previous numbered embodiments, wherein fine inorganic solids are substantially absent from the coating.

6. The film of any one of the previous numbered embodiments, wherein the polyalkylimine condensation product is coated on at least one skin layer.

7. The film of any one of the previous numbered embodiments, wherein the coating weight is less than 0.30 g/m$^2$.

8. The film of any one of the previous numbered embodiments, wherein the matte layer is a blend of at least two incompatible polymers such that the Haze (ASTM D1003) is at least 50 or 60 or 70 or 80%.

9. The film of any one of the previous numbered embodiments, wherein the matte layer is a blend of high density polyethylene and a propylene-ethylene-butene terpolymer.

10. The film of any one of the previous numbered embodiments, wherein the polyalkylimine has a weight average molecular weight of from 3,000 to 2,000,000 g/mol.

11. The film of any one of the previous numbered embodiments, wherein styrenic moieties are absent from the polyalkylimine.

12. The film of any one of the previous numbered embodiments, further comprising a primer layer between the first side of the film and the coating, the primer layer comprising a polyalkylamine having a weight average molecular weight of from 20,000 to 80,000 or 100,000 or 150,000 or 200,000 or 500,000 g/mol.

13. The film of any one of the previous numbered embodiments, wherein from 0.1 or 0.2 to 0.6 or 0.8 or 1.0 or 1.1 or 1.2 or 2.0 or 2.5 or 3.0 amine-reactive equivalents ("ARE") of amine-reactive molecules are combined with the polyalkylimine.

14. The film of any one of the previous numbered embodiments, wherein the condensation product is isolated from an aqueous diluent in solution at a pH of at least 8.0 or 8.5 prior to coating the film.

15. The film of any one of the previous numbered embodiments, the amine-reactive molecule is selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy(methyl)ethyl acrylate, acetoacetoxypropyl acrylate, acetoacetamidoethyl acrylate, acetoacetamidoethyl methacrylate, acetoacetoxybutyl acrylate, and combinations thereof.

16. The film of any one of the previous numbered embodiments, wherein the coating is UV cured.

17. The film of any one of the previous numbered embodiments, wherein the first side of the film has ink printed thereon, and the second side has adhesive adhered thereto.

18. A thermal transfer ribbon label comprising the film of numbered embodiment 17.

Also disclosed is the use of the coating on a multi-layered matte film of any one of the previous numbered embodiments.

Also disclosed is the use of the coated multi-layered matte film of any one of the previous numbered embodiments as a label.

Also disclosed is the use of the coated multi-layered matte film of any one of the previous numbered embodiments as a printed bar code label on a product.

The invention claimed is:

1. A multi-layered matte film, having a first side and second side, comprising a coating on at least the first side, wherein the coating comprises a condensation product of a polyalkylimine and one or more amine-reactive molecules comprising at least one of:

$R^c$=C($R^a$)—(CX$_2$)$_j$—C(O)—(CX$_2$)$_k$—(O—[C$R^d_2$]$_q$)$_p$-A-C(O)—C($R^b$)=CX$_2$ or

Y—(CX$_2$)$_m$—(O—[C$R^d_2$]$_q$)$_p$-A-C(O)—C($R^b$)=CX$_2$ where Y is halogen or a three-membered oxirane ring; $R^a$ and $R^b$ are the same or different and are H or a $C_1$ to $C_6$ to alkyl; $R^c$ is oxygen or $CX_2$; each X can be the same or different and is H, hydroxyl, halogen, or any organic radical containing at least one carbon atom, wherein each $R^d$ can be the same or different and are H or a $C_1$ to $C_6$ to alkyl; A is oxygen or $NR^d$; $CR^d$ and $CR^d_2$ can each be a separate moiety or a portion of a cyclic structure; j, k, and m are integers ranging from 0 to 6, inclusive; q is an integer ranging from 1 to 6, inclusive; and p is an integer ranging from 0 to 30, inclusive; and a primer layer between the first side of the multi-layered matte film and the coating, the primer layer comprising a polyalkylamine having a weight average molecular weight of from 20,000 g/mol to 500,000 g/mol, wherein the multi-layer matte film further comprises at least a core layer of polypropylene, a sealant layer and a matte layer between the sealant layer and core layer.

2. The multi-layered matte film of claim 1, wherein the first side and the second side of the multi-layered matte film are coated with the condensation product.

3. The multi-layered matte film of claim 1, wherein the coating comprises from 50 wt % to 95 wt % of the condensation product and from 5 wt % to 50 wt % fine inorganic solid, wherein each is based on a total weight of the coating.

4. The multi-layered matte film of claim 1, wherein fine inorganic solids are substantially absent from the coating.

5. The multi-layered matte film of claim 1, wherein the condensation product is coated on at least the sealant layer.

6. The multi-layered matte film of claim 1, wherein the coating has a weight of less than 0.30 g/m².

7. The multi-layered matte film of claim 1, wherein the matte layer is a blend of at least two incompatible polymers such that a Haze (ASTM D1003) is at least 50%.

8. The multi-layered matte film of claim 1, wherein the matte layer is a blend of high-density polyethylene and a propylene-ethylene-butene terpolymer.

9. The multi-layered matte film of claim 1, wherein the polyalkylimine has a weight average molecular weight of from 3,000 g/mol to 2,000,000 g/mol.

10. The multi-layered matte film of claim 1, wherein styrenic moieties are absent from the polyalkylimine.

11. The multi-layered matte film of claim 1, wherein from 0.1 to 3.0 amine-reactive equivalents ("ARE") of amine-reactive molecules are combined with the polyalkylimine.

12. The multi-layered matte film of claim 1, wherein the condensation product is isolated from an aqueous diluent in solution at a pH of at least 8.0 prior to coating the multi-layered matte film.

13. The multi-layered matte film of claim 1, wherein the amine-reactive molecule is selected from the group consisting of 2-hydroxy-3-chloropropylacrylate, glycidyl methacrylate (GMA), glycidyl acrylate, acetoacetoxyethyl methacrylate (AAEM), acetoacetoxyethyl acrylate, acetoacetoxy (methyl)ethyl acrylate, acetoacetoxypropyl acrylate, acetoacetamidoethyl acrylate, acetoacetamidoethyl methacrylate, acetoacetoxybutyl acrylate, and combinations thereof.

14. The multi-layered matte film of claim 1, wherein the coating is ultraviolet-cured.

15. The multi-layered matte film of claim 1, wherein the first side of the multi-layered matte film has ink printed thereon, and the second side has adhesive adhered thereto.

16. A thermal transfer ribbon label comprising the multi-layered matte film of claim 15.

17. A multi-layered matte film comprising:

at last one layer of a coating comprising the condensation product of a combination of a polyalkylimine and an acetoacetonate ("AcAc")-functional material or an oxirane-functional material, the acetoacetonate and oxirane-functional materials comprising an ethenic unsaturation group, the coating adhered to a sealant layer;

the sealant layer comprising a polyolefin, having a $T_m$ within a range of from 120° C. to 170° C.; and a melt flow rate (ASTM 1238, 2.16 kg/230° C.) within a range of from 3 g/10 min to 20 g/10 min; and an elongation (ASTM D638) within a range of from 500% to 1200%; and a density of from 0.85 g/cm³ to 0.94 g/cm³ (ASTM D792); and a tensile strength at break (ASTM D638) within a range from 30 MPa to 60 MPa; and a Flexural Modulus (ASTM D790) within a range from 500 MPa to 1200 MPa;

a primer layer applied between the sealant layer and the coating, the primer layer comprising a polyalkylamine having a weight average molecular weight of from 20,000 g/mol to 500,000 g/mol;

a core polypropylene layer; and a matte layer between the sealant layer and the core polypropylene layer, the matte layer comprising a blend of at least two incompatable polymers such that a Haze (ASTM D1003) is at least 50% or 60% or 70% or 80%.

18. The multi-layered matte film of claim 17, wherein the coating comprises from 50 wt % to 95 wt % of the condensation product and from 5 wt % to 50 wt % fine inorganic solid, wherein each is based on a total weight of the coating.

19. The multi-layered matte film of claim 17, wherein fine inorganic solids are substantially absent from the coating.

20. The multi-layered matte film of claim 17, wherein the coating has a weight of less than 0.30 g/m².

21. The multi-layered matte film of claim 17, wherein the matte layer comprises a blend of a propylene-ethylene-butene terpolymer present within a range of from 30 wt % to 70 wt %; high-density polyethylene present within a range of from 5 to 15 wt %; and polypropylene making up a remainder of the blend.

22. The multi-layered matte film of claim 17, wherein the coating is ultraviolet-cured.

23. The multi-layered matte film of claim 17, wherein a first side of the multi-layered matte film has ink printed thereon, and a second side of the multi-layered matte film has adhesive adhered thereto.

24. A thermal transfer ribbon label comprising the multi-layered matte film of claim 23.

* * * * *